April 23, 1946.　　　C. E. TACK ET AL　　　2,399,071
RAILWAY BRAKE
Filed Sept. 6, 1943　　　3 Sheets-Sheet 2
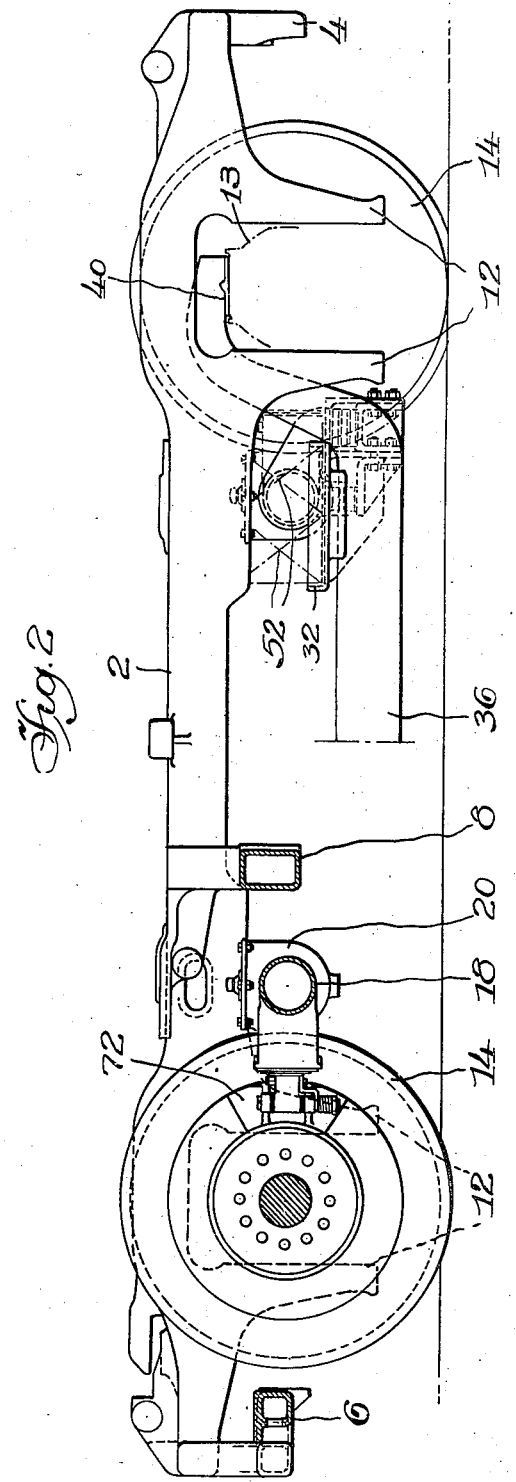
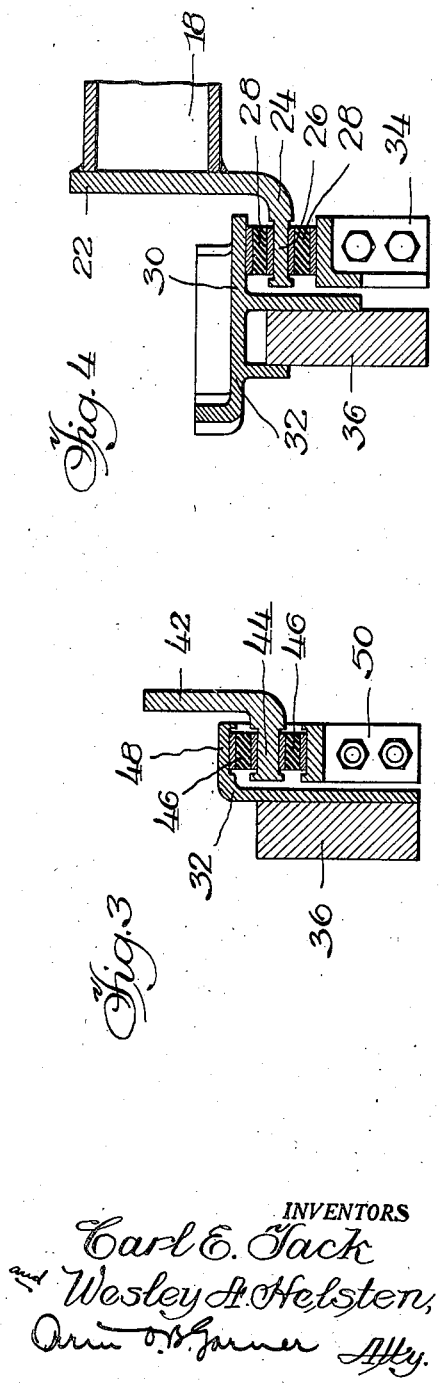
INVENTORS
Carl E. Tack
Wesley H. Helsten

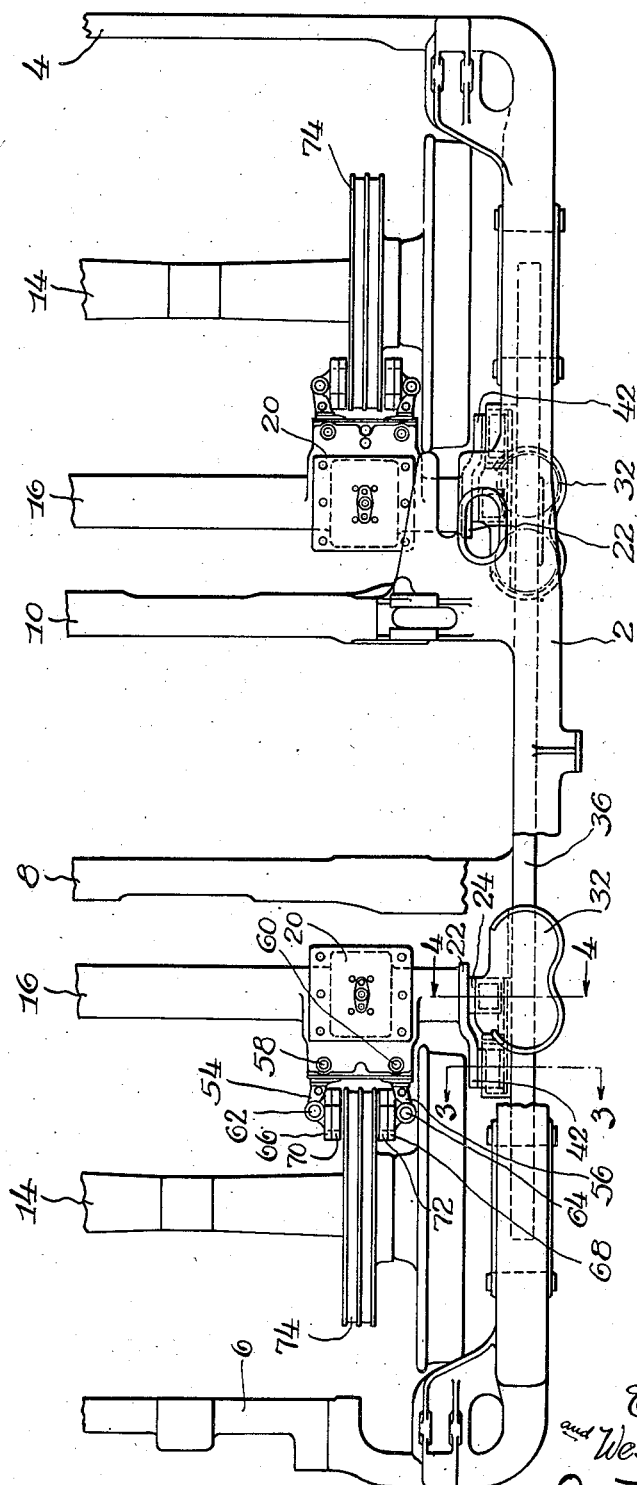

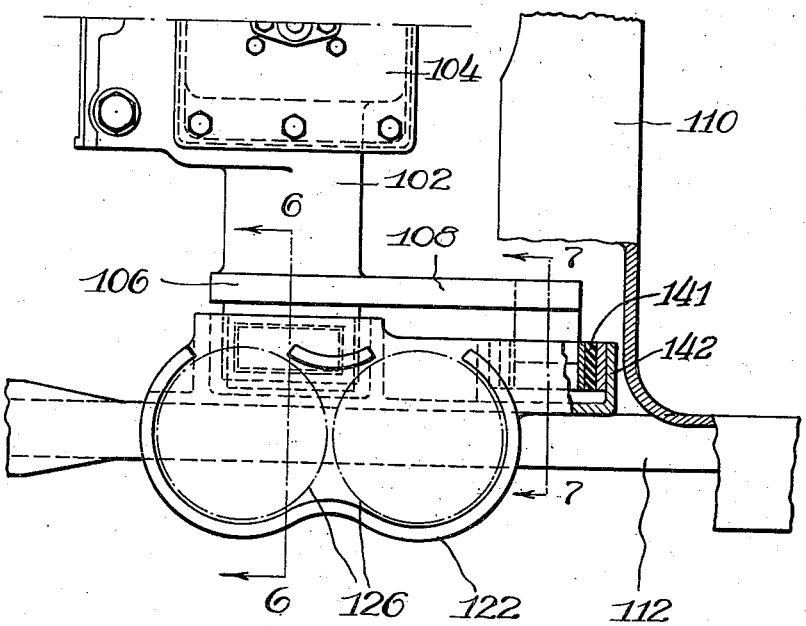
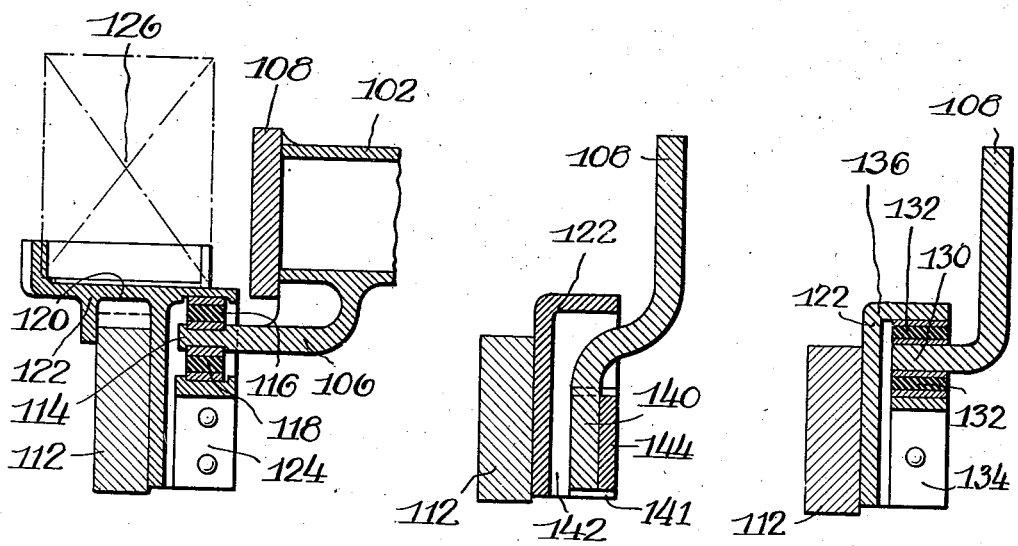

Patented Apr. 23, 1946

2,399,071

UNITED STATES PATENT OFFICE

REISSUED
JAN 20 1948

2,399,071

RAILWAY BRAKE

Carl E. Tack and Wesley A. Helsten, Chicago, Ill., assignors to American Steel Foundries, Chicago, Ill., a corporation of New Jersey Application September 6, 1943, Serial No. 501,363

14 Claims. (Cl. 188—59)

Our invention relates to railway brake mechanism and is illustrated in an embodiment utilizing a four wheel passenger car truck. Our invention is more particularly concerned with the application to railway car trucks of a practical disc brake arrangement wherein clasp brake means is supported from the truck frame for engagement with rotor discs carried on the supporting wheel and axle assemblies.

The general object of our invention is to devise a rotor braking arrangement for a railway car truck which will be generally applicable to existing types of trucks and will suitably meet the existing manufacturing standard requirements, such as clearance conditions, standards of strength and the like.

A more specific object of our invention is to devise such a brake utilizing an independent brake support associated with each wheel and axle assembly and conveniently supported from the equalizer normally utilized in the common type of passenger car truck.

Our novel structure contemplates an arrangement wherein the brake supports may be supported intermediate the wheels and may be resiliently carried from the equalizers at opposite sides of the truck, to which equalizers may also be connected a torque arm at one side of the truck or at both sides as may be desired. As illustrated, said torque arm may project toward the adjacent wheel and axle assembly or away from it as may be convenient with the particular truck structure utilized, but, generally speaking, the more suitable structure and lighter weights may be utilized when the torque arm projects toward the adjacent wheel and axle assembly.

In the drawings, Figure 1 is a top plan view of one side of a railway car structure utilizing our invention, the other half being symmetrical thereto.

Figure 2 is a side view of the truck and brake arrangement shown in Figure 1, the right half thereof being in elevation and the left half thereof being in section along the vertical longitudinal plane bisecting the truck.

Figure 3 is a transverse vertical section taken approximately in the plane indicated by the line 3—3 of Figure 1 through the connection of the brake support torque arm with the equalizer.

Figure 4 is a parallel sectional view taken approximately in the transverse vertical plane indicated by the line 4—4 of Figure 1 and showing the main connection of the brake support with the adjacent equalizer.

Figure 5 is a fragmentary top plan view comparable to the view of Figure 1 illustrating a torque arm connected to the equalizer on the side of the brake support remote from the adjacent wheel and axle assembly.

Figure 6 is a sectional view in the transverse vertical plane indicated by the line 6—6 of Figure 5.

Figure 7 is a sectional view approximately in the transverse vertical plane indicated by the line 7—7 of Figure 5, and Figure 8 is a sectional view comparable to Figure 7 illustrating an alternate form of connection.

Describing our novel structure in detail, our brake arrangement is illustrated as applied to a four wheel car truck of conventional form utilizing the side rail 2, the end rails 4 and 6, and the spaced transoms 8 and 10 between which may be supported the usual bolster. The side rail may have conventional pedestal jaws 12, 12 adjacent each end thereof for reception of journal boxes as indicated at 13 (Figure 2, right) within which may be carried in usual manner the journal ends of the supporting wheel and axle assemblies 14, 14. Intermediate each wheel and the adjacent transom may be supported a brake support generally designated 16, each of said brake supports comprising a main transverse member 18, here illustrated as circular in section (Figure 2), said transverse member supporting at each end thereof a housing 20 enclosing clasp brake mechanism of a form more particularly described in detail in Tack co-pending application, Serial No. 421,418, filed in the United States Patent Office December 3, 1941, now Patent No. 2,355,120, issued Aug. 8, 1944.

The brake support 16 may have at each extremity thereof an end bracket 22, the depending leg 24 of which (Figure 4) may have a horizontal portion 26 secured between resilient pads 28, 28 which may be compressed between the bottom wall 30 of the spring seat casting generally designated 32 and the clamping piece 34 therebelow. The spring seat 32 may be seated on the adjacent equalizer 36, respective ends of which may be supported on the journal boxes at opposite ends of the truck in usual manner and as well illustrated at 40 (Figure 2, right). Integrally formed with the end bracket 22 may be the horizontally projecting torque arm 42, the extremity of which may have a flange 44 (Figure 3) received between top and bottom resilient pads 46, 46 which may be under compression between the horizontal web 48 of the spring seat casting 32 and the adjacent clamping piece 50. Each spring seat 32 may afford support for the adjacent side rail 2 in usual manner by coil springs 52, 52, as diagrammatically illustrated at the right of Figure 2.

The clasp brake mechanism associated with each housing 20 may comprise inboard and outboard brake levers 54 and 56 (Figure 1) fulcrumed as at 58 and 60 respectively from the housing 20 and pivotally supporting at their projecting ends as at 62 and 64 brake heads 66 and 68 carrying brake shoes 70 and 72 for engagement with the inboard and outboard friction faces of the adjacent brake rotor 74. The brake rotor 74 may be mounted as convenient upon the adjacent wheel and axle assembly 14.

The modification illustrated in Figure 5 is generally similar to that just described, including the member 102 of the brake support with the housing 104 carrying the clasp brake mechanism, as already described. In this modification, however, the end bracket 106 is somewhat different from that described for the previous modification, and particularly in that the torque arm 108 thereof projects toward the adjacent transom 110 and so in the reverse direction from that described for the previous modification. The details of the connection between the brake support 102 and the equalizer 112 of the modification now under consideration are well shown in the detail of Figures 6 and 7 wherein it may be seen that the transverse member 102 has the integrally formed end bracket 106, a horizontal portion of which may be under compression as at 114 between the top and bottom resilient pads 116 and 118 which may be secured between the clamping piece 124 and the horizontal web 120 of the spring seat casting generally designated 122. Said spring seat casting 122 may support springs diagrammatically indicated at 126, 126 upon which may be carried the adjacent side frame in conventional manner and as already described for the preceding modification. The spring seat casting 122 may seat upon the equalizer 112 and be fixed thereto in any convenient manner.

The torque arm 108 may have an end portion 140 (Figure 7) with the thickening pad 144 secured at the extremity thereof and confined between resilient pads 141, 141 at opposite sides thereof. Each resilient pad 141 may include a rubber block vulcanized between metal plates and the remote plates may be fixed to inturned flanges 142, 142 integrally formed with the spring seat casting 122. As an alternate the torque arm 108 may be connected as illustrated in Figure 8 wherein it is shown as incorporating an end flange 130 secured between the resilient means 132, 132 under compression between the clamping piece 134 and the horizontal web 136 of the adjacent portion of the spring seat 122.

In both of the modifications illustrated, it will be clear to those skilled in the art that we may utilize a torque arm at each end of the brake support or we may utilize a torque arm at only one end of the brake support. In the latter case all of the torque would be taken in only one equalizer, of course, at one side of the truck and only under certain conditions would this be advisable. Under other circumstances a torque arm would be used at each end of the brake support.

To those skilled in the art it will be readily apparent that we have devised a brake arrangement wherein the brake support carrying the brake shoes is supported from the equalizers which are unsprung members as also are the wheel and axle assemblies on which are carried the brake drums or discs against which the brake shoes must bear. The advantages of such an arrangement are obvious inasmuch as the relative movement vertically of the transom and the wheel and axle assembly is relatively negligible as compared with the condition which exists when the brake support is carried from the spring supported portion of the truck frame.

It is to be understood that we do not wish to be limited by the exact embodiments of the device shown which are merely by way of illustration and not limitation as various and other forms of the device will, of course, be apparent to those skilled in the art without departing from the spirit of the invention or the scope of the claims.

We claim:

1. In a brake arrangement, a truck structure comprising spaced wheel and axle assemblies, unsprung equalizers supported thereon, spring seats on said equalizers adjacent each assembly, a truck frame spring-supported from said seats and including spaced transoms, and brake mechanism including brake supports carried from said seats intermediate each assembly and the adjacent transom, said brake mechanism being independent of sprung portions of said truck structure, each of said brake supports comprising clasp brake means with brake shoes for engagement with rotatable means on the adjacent assembly, and each of said brake supports having at each end thereof spaced resilient connections to the adjacent seat, one of said connections being in the vertical plane of said support.

2. In a brake arrangement, a truck structure comprising spaced wheel and axle assemblies, equalizers supported thereon, spring seats on said equalizers adjacent each assembly, springs on said seats, a truck frame including spaced transoms supported on said springs, and brake mechanism including rigid elements supported from said seats intermediate each assembly and the adjacent transom, said brake mechanism and elements being independent of sprung portions of said truck structure, each of said elements supporting clasp brake means with brake shoes for engagement with rotatable means on the adjacent assembly, and each of said elements having spaced resilient connections to the adjacent seat, one of said connections being in the plane of said element and the other being intermediate the element and the adjacent assembly.

3. In a brake arrangement, a truck structure comprising spaced wheel and axle assemblies, equalizers mounted thereon, spring seats on said equalizers adjacent each assembly, springs on said seats, a truck frame with spaced transoms carried on said springs, and brake mechanism including brake supports resiliently supported from said seats below the level of said springs intermediate each assembly and the adjacent transom and independent of said frame, each of said supports carrying clasp brake means with shoes for engagement with rotatable means on the adjacent assembly, and each of said supports being resiliently connected at spaced points to at least one of the supporting equalizers.

4. In a brake arrangement for a railway car truck, a truck structure including a wheel and axle assembly, equalizers thereon, a truck frame spring-supported from said equalizers, and a rigid brake element resiliently supported from said equalizers intermediate the wheels and carrying brake shoes for engagement with rotatable means on said assembly, said element having torque arms projecting toward said assembly and connected to respective equalizers, said resilient support being in the plane of said element.

5. In a brake arrangement for a railway car truck, a structure including wheel and axle assemblies, unsprung truck members connecting said assemblies, sprung truck members affording support for an associated car body, and braking means mounted on said unsprung members independent of said sprung members, said braking means including rigid brake elements supporting brake shoes engaging opposite sides of rotating means on said assemblies, each of said brake elements comprising a main transverse member resiliently connected at spaced points to each of said unsprung members, one of said connections being approximately in the plane of said transverse member and the other thereof being spaced therefrom longitudinally of said truck.

6. In a railway car truck, a wheel and axle assembly mounting brake drums, unsprung truck members carried thereon and supporting spring seats, springs on said seats, a frame member on said springs, and braking means including a rigid support resiliently mounted at spaced points from each of said unsprung members independent of said frame member and carrying clasp brake means for said drums, one of said points being in the plane of said support.

7. In a brake arrangement for a railway car truck comprising spaced wheel and axle assemblies with braking surfaces, equalizers supported from said assemblies, springs on said equalizers, a truck frame mounted on said springs, a brake beam extending transversely of said truck adjacent each assembly, means on the inboard side of each equalizer resiliently supporting at spaced points the adjacent end of said beam, and friction means carried by said beam for cooperation with the braking surfaces of the adjacent assembly, said points being below the level of said springs.

8. In a brake arrangement for a railway car truck comprising a wheel and axle assembly, unsprung members supported therefrom, spring seats on said members, a truck frame resiliently supported from said seats, a brake beam resiliently supported at spaced points from respective seats substantially below the level of said axle, said resilient supports constituting the sole mounting means for said beam with respect to said truck, and braking means carried by said beam for decelerating rotation of said assembly.

9. In a brake arrangement, a truck structure comprising spaced wheel and axle assemblies, equalizers supported thereon, spring seats on said equalizers adjacent each assembly, springs on said seats, a truck frame including spaced transoms supported on said springs, and brake mechanism including rigid elements supported from said seats intermediate each assembly and the adjacent transom, said brake mechanism and elements being independent of sprung portions of said truck structure, each of said elements supporting clasp brake means with brake shoes for engagement with rotatable means on the adjacent assembly, and each of said elements having spaced resilient connections to the adjacent seats, one of said connections being in the plane of said element and the other being intermediate the element and the adjacent assembly, both of said connections being below the level of said springs.

10. In a brake arrangement, a truck structure comprising spaced wheel and axle assemblies, equalizers mounted thereon, spring seats on said equalizers adjacent each assembly, springs on said seats, a truck frame with spaced transoms carried on said springs, and brake mechanism including brake supports resiliently supported from said seats below the level of said springs intermediate each assembly and the adjacent transom and independent of said frame, each of said supports carrying clasp brake means with shoes for engagement with rotatable means on the adjacent assembly, and each of said supports being resiliently connected at spaced points to at least one of the supporting equalizers, one of said points being in the plane of said support.

11. In a brake arrangement for a railway car truck, a structure including wheel and axle assemblies, unsprung truck members connecting said assemblies, sprung truck members affording support for an associated car body, and braking means mounted on said unsprung members independent of said sprung members, said braking means including a rigid brake element supporting brake shoes engaging opposite sides of rotating means on one of said assemblies, said brake element comprising a main transverse member resiliently connected at spaced points to each of said unsprung members, one of said connections being approximately in the plane of said transverse member and the other thereof being spaced therefrom longitudinally of said truck in the direction of the associated wheel and axle assembly.

12. In a brake arrangement for a railway car truck, a structure including wheel and axle assemblies, unsprung truck members connecting said assemblies, sprung truck members affording support for an associated car body, and braking means mounted on said unsprung members independent of said sprung members, said braking means including a rigid brake element supporting brake shoes engaging opposite sides of rotating means on one of said assemblies, said brake element comprising a main transverse member resiliently connected at spaced points to each of said unsprung members, one of said connections being approximately in the plane of said transverse member and the other thereof being spaced therefrom longitudinally of said truck in the direction of the remote assembly.

13. In a railway car truck, a wheel and axle assembly mounting brake drums, unsprung truck members carried thereon and supporting spring seats, springs on said seats, a frame member on said springs, and braking means including a rigid support resiliently mounted at spaced points from each of said unsprung members independent of said frame member and carrying clasp brake means for said drums, one of said points being in the plane of said support and both of said points being below the level of said springs.

14. In a brake arrangement for a railway car truck comprising spaced wheel and axle assemblies with braking surfaces, equalizers supported from said assemblies, springs on said equalizers, a truck frame mounted on said springs, a brake beam extending transversely of said truck adjacent each assembly, means on the inboard side of each equalizer resiliently supporting at spaced points the adjacent end of said beam, and friction means carried by said beam for cooperation with the braking surfaces of the adjacent assembly, both of said points being below the level of said springs and one of said points being in the plane of said beam.

CARL E. TACK.
WESLEY A. HELSTEN.